United States Patent
Wiedenhoefer et al.

(10) Patent No.: US 12,055,098 B2
(45) Date of Patent: Aug. 6, 2024

(54) HYDROGEN POWERED ENGINE WITH EXHAUST HEAT EXCHANGER

(71) Applicant: RTX Corporation, Farmington, CT (US)

(72) Inventors: James Wiedenhoefer, Windsor, CT (US); Joseph B. Staubach, Colchester, CT (US); Marc J. Muldoon, Marlborough, CT (US); Charles E. Lents, Amston, CT (US); Brian M. Holley, Eastford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/860,215

(22) Filed: Jul. 8, 2022

(65) Prior Publication Data

US 2023/0011956 A1   Jan. 12, 2023

Related U.S. Application Data

(60) Provisional application No. 63/220,136, filed on Jul. 9, 2021.

(51) Int. Cl.
| | | |
|---|---|---|
| *F02C 7/224* | (2006.01) | |
| *F02C 3/22* | (2006.01) | |
| *F02C 7/22* | (2006.01) | |

(52) U.S. Cl.
CPC ............... *F02C 7/224* (2013.01); *F02C 3/22* (2013.01); *F02C 7/222* (2013.01)

(58) Field of Classification Search
CPC .. F02C 7/222; F02C 7/224; F02C 3/20; F02C 3/22; F28F 9/0221; F28D 2001/0273; F28D 1/047; F23C 2900/9901
See application file for complete search history.

(56) References Cited

U.S. PATENT DOCUMENTS 3,237,400 A  *  3/1966  Kuhrt ..................... F02C 7/224
                                                    60/260
3,237,401 A  *  3/1966  Peters ..................... F02C 7/224
                                                    60/260

(Continued)

FOREIGN PATENT DOCUMENTS

| EP | 3623602 A1 | 3/2020 |
|---|---|---|
| EP | 3623603 A1 | 3/2020 |
| EP | 3623604 A1 | 3/2020 |

OTHER PUBLICATIONS

European Search Report for European Application No. 22184112.5; Date of Action: Dec. 5, 2022; 6 pages.

*Primary Examiner* — William H Rodriguez
(74) *Attorney, Agent, or Firm* — CANTOR COLBURN LLP

(57) ABSTRACT

A turbine engine system includes at least one hydrogen fuel tank, a core flow path heat exchanger in a core flow path; and engine systems located in the core flow path. The engine system including at least a compressor section, a combustor section having a burner, and a turbine section. The core flow path heat exchanger is arranged in the core flow path downstream of the combustor section. The hydrogen fuel is supplied from the at least one hydrogen fuel tank through a hydrogen fuel supply line, passing through the core flow path heat exchanger and then supplied into the burner for combustion.

19 Claims, 11 Drawing Sheets

(56) References Cited

U.S. PATENT DOCUMENTS

| | | | | |
|---|---|---|---|---|
| 3,241,311 | A * | 3/1966 | Kuhrt | F02C 1/007 |
| | | | | 60/269 |
| 4,272,953 | A | 6/1981 | Rice | |
| 5,363,641 | A * | 11/1994 | Dixon | F02C 6/08 |
| | | | | 60/788 |
| 5,392,595 | A | 2/1995 | Glickstein | |
| 10,989,117 | B2 | 4/2021 | Roberge | |
| 11,603,798 | B1 * | 3/2023 | Terwilliger | F02C 3/22 |
| 11,661,889 | B1 * | 5/2023 | Muldoon | F02C 3/22 |
| | | | | 415/116 |
| 2002/0023740 | A1 * | 2/2002 | Lowenstein | F28F 21/065 |
| | | | | 165/166 |
| 2006/0185347 | A1 * | 8/2006 | Knapp | F01C 13/04 |
| | | | | 60/269 |
| 2019/0186293 | A1 * | 6/2019 | Boutaleb | F01D 9/041 |
| 2020/0088099 | A1 | 3/2020 | Roberge | |
| 2020/0088102 | A1 | 3/2020 | Roberge | |
| 2021/0139160 | A1 | 5/2021 | Kool et al. | |
| 2021/0340908 | A1 * | 11/2021 | Boucher | F02C 3/22 |
| 2021/0348561 | A1 * | 11/2021 | Cocks | F02C 7/12 |
| 2022/0099020 | A1 * | 3/2022 | Palmer | F02C 7/143 |
| 2022/0099299 | A1 * | 3/2022 | Carrotte | F02C 7/143 |
| 2022/0128310 | A1 * | 4/2022 | Wiedenhoefer | F28D 7/1623 |
| 2022/0195928 | A1 * | 6/2022 | Johnson | F02C 3/107 |
| 2022/0282925 | A1 * | 9/2022 | Daggett | F28D 1/0435 |
| 2022/0364504 | A1 * | 11/2022 | Staubach | F28F 9/0131 |
| 2022/0364802 | A1 * | 11/2022 | Staubach | F02C 7/14 |
| 2023/0010158 | A1 * | 1/2023 | Muldoon | F02C 9/40 |

\* cited by examiner

HYDROGEN POWERED ENGINE WITH EXHAUST HEAT EXCHANGER

CROSS-REFERENCE TO RELATED APPLICATIONS

This application claims the benefit of U.S. Provisional Application 63/220,136, filed Jul. 9, 2021, the disclosure of which is incorporated herein by reference in its entirety.

BACKGROUND

The present disclosure relates generally to turbine engines and aircraft engines, and more specifically to employing hydrogen fuel systems and related systems with turbine and aircraft engines.

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF DESCRIPTION

According to one embodiment, a turbine engine system is provided. The turbine engine system includes at least one hydrogen fuel tank, a core flow path heat exchanger in a core flow path; and engine systems located in the core flow path. The engine system including at least a compressor section, a combustor section having a burner, and a turbine section. The core flow path heat exchanger is arranged in the core flow path downstream of the combustor section. The hydrogen fuel is supplied from the at least one hydrogen fuel tank through a hydrogen fuel supply line, passing through the core flow path heat exchanger and then supplied into the burner for combustion.

In addition to one or more of the features described above, or as an alternative, further embodiments may include that the core flow path heat exchanger is a hydrogen-to-air heat exchanger.

In addition to one or more of the features described above, or as an alternative, further embodiments may include that the turbine section further includes a high pressure turbine and a low pressure turbine arranged downstream of the high pressure turbine and the combustor section. The core flow path heat exchanger is arranged in the core flow path downstream of the low pressure turbine.

In addition to one or more of the features described above, or as an alternative, further embodiments may include that the turbine section further comprises a high pressure turbine and a low pressure turbine arranged downstream of the high pressure turbine and the combustor section, wherein the core flow path heat exchanger is arranged in the core flow path between the low pressure turbine and the high pressure turbine.

In addition to one or more of the features described above, or as an alternative, further embodiments may include that the main engine core further includes an outlet arranged downstream of the low pressure turbine. The core flow path heat exchanger is arranged in the core flow path downstream of the low pressure turbine and upstream of the outlet.

In addition to one or more of the features described above, or as an alternative, further embodiments may include that the core flow path heat exchanger further includes a radially outward plenum assembly, a radially inward plenum assembly, and a plurality of heat transfer tubes extending from the radially inward plenum assembly to the radially outward plenum assembly across the core flow path.

In addition to one or more of the features described above, or as an alternative, further embodiments may include that each of the plurality of heat transfer tubes is configured to convey the hydrogen fuel therein across the core flow path of the turbine engine system.

In addition to one or more of the features described above, or as an alternative, further embodiments may include that the hydrogen fuel is configured to absorb heat from the core flow path through each of the plurality of heat transfer tubes while traversing the core flow path within each of the plurality of heat transfer tubes.

In addition to one or more of the features described above, or as an alternative, further embodiments may include that the radially outward plenum assembly further includes a plurality of radially outward plenum layers. A radially outward plenum is formed between each of the plurality of radially outward plenum layers. The radially outward plenum is configured to convey the hydrogen fuel to the plurality of heat transfer tubes or receive the hydrogen fuel from the plurality of heat transfer tubes.

In addition to one or more of the features described above, or as an alternative, further embodiments may include that the radially outward plenum extends circumferentially around an engine central longitudinal axis of the turbine engine system.

In addition to one or more of the features described above, or as an alternative, further embodiments may include that the radially outward plenum assembly further includes one or more radially outward plenum orifices fluidly connecting the radially outward plenum to other radially outward plenum within the radially outward plenum assembly.

In addition to one or more of the features described above, or as an alternative, further embodiments may include that the radially outward plenum assembly further includes a plurality of radially outward plenum layers. A radially outward tube receiving orifice is formed between each of the plurality of radially outward plenum layers. The radially outward tube receiving orifice being configured to receive therein a heat transfer tube of the plurality of heat transfer tubes.

In addition to one or more of the features described above, or as an alternative, further embodiments may include that the radially inward plenum assembly further includes a plurality of radially inward plenum layers. A radially inward plenum is formed between each of the plurality of radially inward plenum layers. The radially inward plenum is configured to convey the hydrogen fuel to the plurality of heat transfer tubes or receive the hydrogen fuel from the plurality of heat transfer tubes.

In addition to one or more of the features described above, or as an alternative, further embodiments may include that the radially inward plenum extends circumferentially around an engine central longitudinal axis of the turbine engine system.

In addition to one or more of the features described above, or as an alternative, further embodiments may include that the radially inward plenum assembly further includes one or more radially inward plenum orifices fluidly connecting the radially inward plenum to other radially inward plenum within the radially inward plenum assembly.

In addition to one or more of the features described above, or as an alternative, further embodiments may include that the radially inward plenum assembly further includes a plurality of radially inward plenum layers. A radially inward tube receiving orifice is formed between each of the plurality of radially inward plenum layers. The radially inward tube receiving orifice being configured to receive therein a heat transfer tube of the plurality of heat transfer tubes.

According to another embodiment, a method of assembling a core flow path heat exchanger for a turbine engine system is provided. The method includes stacking a plurality of radially outward plenum layers. A radially outward plenum is formed between each of the plurality of radially outward plenum layers. A radially outward tube receiving orifice is formed between each of the plurality of radially outward plenum layers. The method further includes stacking a plurality of radially inward plenum layers. A radially inward plenum is formed between each of the plurality of radially inward plenum layers and a radially inward tube receiving orifice is formed between each of the plurality of radially inward plenum layers. The method also includes inserting a radially outward end of a heat transfer tube into the radially outward tube receiving orifice, inserting a radially inward end of the heat transfer tube into the radially inward tube receiving orifice, and metallurgically bonding the plurality of radially outward plenum layers together. The plurality of radially inward plenum layers together, the radially outward end of the heat transfer tube within the radially outward tube receiving orifice, and the radially inward end of the heat transfer tube within the radially inward tube receiving orifice. The method further includes operably connecting the core flow path heat exchanger to a hydrogen fuel tank.

In addition to one or more of the features described above, or as an alternative, further embodiments may include that the metallurgically bonding includes at least one of field assisted sintering technology (FAST) and spark plasma sintering (SPS).

In addition to one or more of the features described above, or as an alternative, further embodiments may include that the metallurgically bonding includes applying a load to compress the plurality of radially outward plenum layers together, the plurality of radially inward plenum layers together, the radially outward end of the heat transfer tube within the radially outward tube receiving orifice, and the radially inward end of the heat transfer tube within the radially inward tube receiving orifice. The metallurgically bonding may also include applying an electrical current to the core flow path heat exchanger.

In addition to one or more of the features described above, or as an alternative, further embodiments may include forming each of the plurality of radially outward plenum layers and forming each of the plurality of radially inward plenum layers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
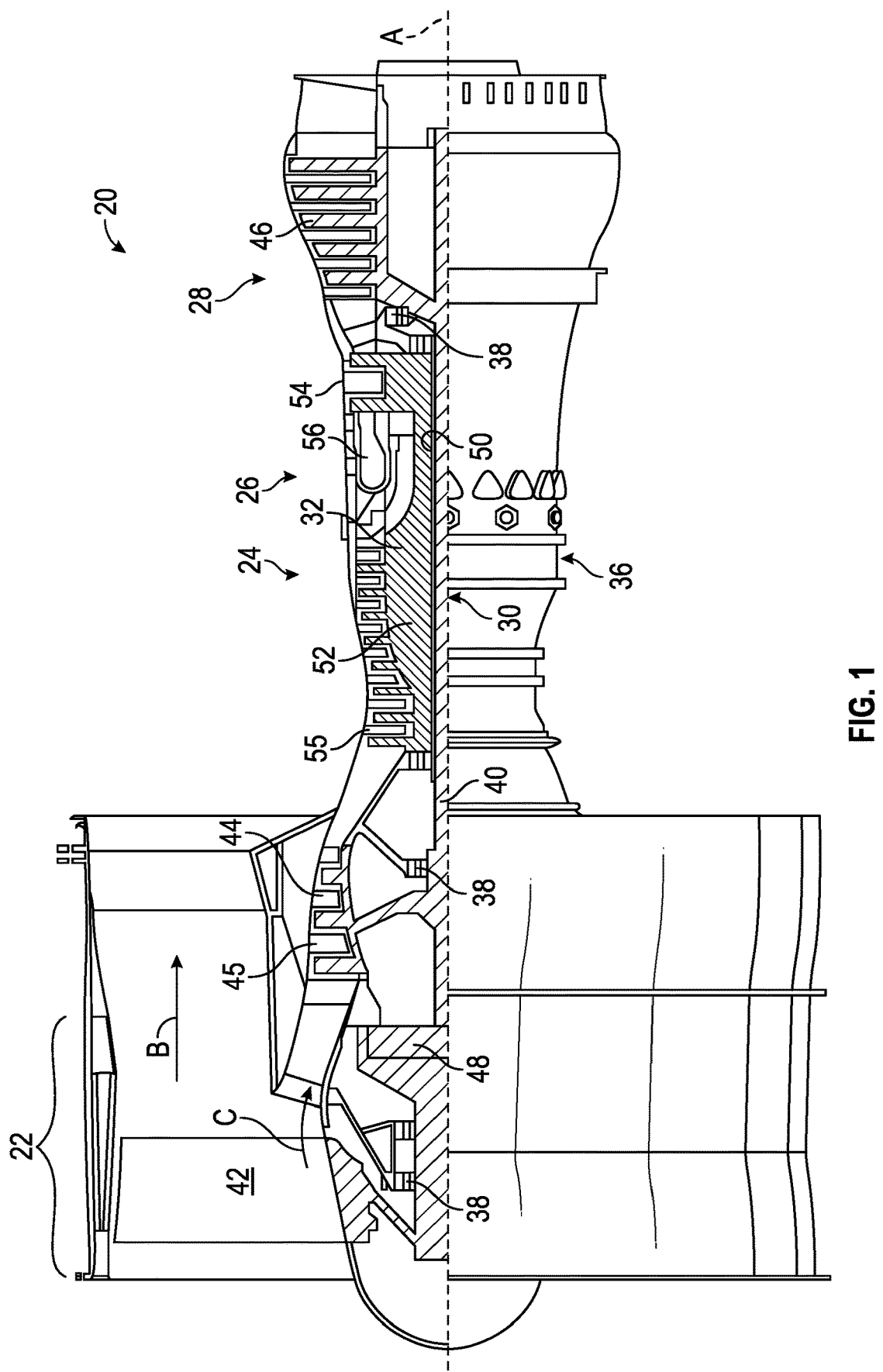
FIG. 1 is a schematic cross-sectional illustration of a gas turbine engine architecture that may employ various embodiments disclosed herein.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (' TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Gas turbine engines generate substantial amounts of heat that is exhausted from the turbine section 28 into a surrounding atmosphere. This expelled exhaust heat represents wasted energy and can be a large source of inefficiency in gas turbine engines. Further, transitioning away from hydrocarbon-based engines may be significant advantages, as described herein.

One option to replace hydrocarbon-based fuel is hydrogen fuel. Hydrogen fuel is required to be store at low temperatures in order to maintain them in a liquid state. A heat source is required to increase the temperature of the hydrogen fuel prior to combustion. Embodiments disclosed herein relate to the design and manufacture of a lightweight heat exchanger that can be packaged into the hydrogen based engine and heat up the hydrogen fuel prior to combustion.

Field assisted sintering technology (FAST), also known as spark plasma sintering (SPS), is a consolidation process at temperatures lower than the melting point of the materials being worked on. Similar to hot pressing, FAST forms bonds between materials but at temperatures that are about ~200 C lower than their melting point(s). FAST utilizes a high amperage pulsed direct current (DC) electrical current to heat the materials to be bonded through Joule heating while under uniaxial compression. The consolidation is a combination of solid-state transport mechanisms including primarily diffusion and creep. The result is a metallurgical bond between the materials to be joined. Consolidation or joining can be accomplished in a variety of conductive and non-conductive materials and forms. Recently, FAST/SPS has been gaining acceptance for consolidation of powder materials into dense compacts with significantly greater efficiency than hot pressing. Due to the lower processing temperatures over other consolidation methods, FAST/SPS mitigates significant grain growth common in other diffusional bonding methods.

As will be described below, a multi-layer build-up of a heat exchanger by FAST processing can allow for heat transfer tubes to be attached to a radially outward plenum assembly and a radially inward plenum assembly.

After machining preparation of multiple layers of the radially outward plenum assembly and the radially inward plenum assembly, the multiple layers of the radially outward plenum assembly, the radially inward plenum assembly, and the heat transfer tubes are bonded using FAST processing.

This FAST processing can occur between similar or dissimilar materials. For example, a hot side part can be constructed of an alloy optimized for oxidation and a cold side part can be constructed from an alloy optimized for corrosion resistance.

Figure 2:
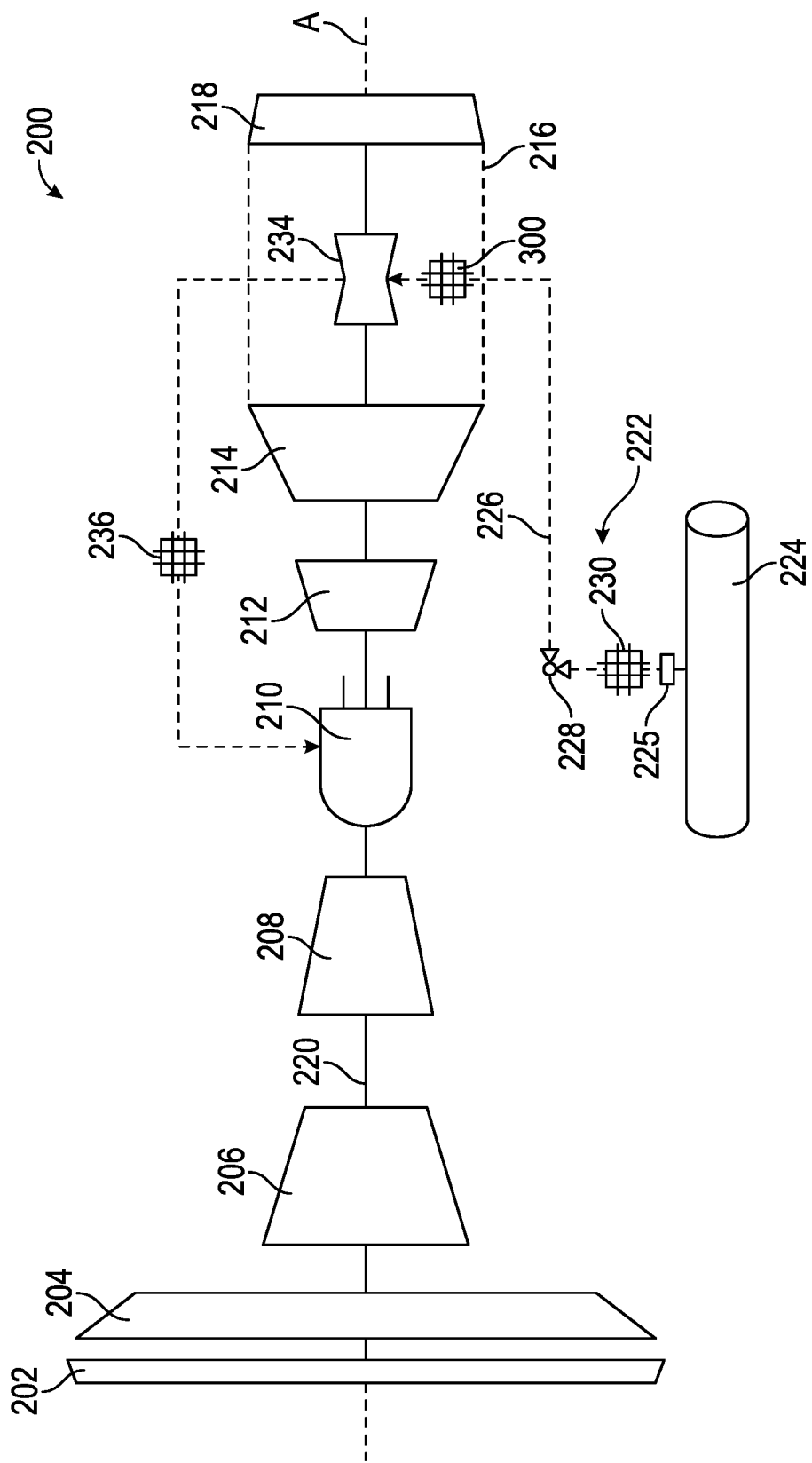
FIG. 2 is a schematic illustration of a turbine engine system in accordance with an embodiment of the present disclosure that employs a non-hydrocarbon fuel source.

Referring now to FIG. 2, a schematic diagram of a turbine engine system 200 is illustrated, in accordance with an embodiment of the present disclosure. The turbine engine system 200 may be similar to that shown and described above but is configured to employ a non-hydrocarbon fuel source, such as hydrogen. The turbine engine system 200 includes an inlet 202, a fan 204, a low pressure compressor 206, a high pressure compressor 208, a combustor 210, a high pressure turbine 212, a low pressure turbine 214, a turbine exhaust case 216, and an outlet 218. A core flow path is defined through, at least, the compressor 206, 208, the turbine 212, 214, and the combustor sections 210. The compressor 206, 208, the turbine 212, 214, and the fan 204 are arranged along a shaft 220. The shaft 220 is aligned along the engine central longitudinal axis A of the turbine engine system 200.

As shown, the turbine engine system 200 includes a hydrogen fuel system 222. The hydrogen fuel system 222 is configured to supply a hydrogen fuel from a hydrogen fuel tank 224 to the combustor 210 for combustion thereof. In this illustrative embodiment, the hydrogen fuel may be supplied from the hydrogen fuel tank 224 to the combustor 210 through a hydrogen fuel supply line 226. The hydrogen fuel supply line 226 may be controlled by a flow controller 228 (e.g., pump(s), valve(s), or the like). The flow controller 228 may be configured to control a flow through the hydrogen fuel supply line 226 based on various criteria as will be appreciated by those of skill in the art. For example, various control criteria can include, without limitation, target flow rates, target pressure, target hydrogen expansion turbine output, cooling demands at one or more heat exchangers, target flight envelopes, etc. The pressure of the hydrogen fuel will be increased at the flow controller 228, preferably when the hydrogen fuel is in the liquid state for low pressurization power. As shown, between the hydrogen fuel tank 224 and the flow controller 228 may be one or more heat exchangers 230, which can be configured to provide cooling to various systems onboard an aircraft by using the hydrogen fuel as a cold-sink. Such hydrogen heat exchangers 230 may be configured to warm the hydrogen and aid in a transition from a liquid state to a gaseous state for combustion within the combustor 210. As shown, between the hydrogen fuel tank 224 and the heat exchangers 230 may be one or more fluid pumps 225, which can be configured to increase the pressure of the hydrogen fuel flowing from the hydrogen fuel tank 224. The heat exchangers 230 may receive the hydrogen fuel directly from the hydrogen fuel tank 224 as a first working fluid and a component-working fluid for a different onboard system. For example, the heat exchanger 230 may be configured to provide cooling to power electronics of the turbine engine system 200 (or other aircraft power electronics). In some non-limiting embodiments, an optional secondary fluid circuit may be provided for cooling one or more aircraft loads. In this secondary fluid circuit, a secondary fluid may be configured to deliver heat from the one or more aircraft loads to a single liquid hydrogen heat exchanger. As such, heating of the hydrogen fuel and cooling of the secondary fluid may be achieved. The above described configurations and variations thereof may serve to begin raising a temperature of the hydrogen fuel to a desired temperature for efficient combustion in the combustor 210.

After the flow controller increases the H2 pressure, pumping it to high pressure as a liquid in one embodiment, the hydrogen fuel may then pass through an optional supplemental heating heat exchanger 236. The supplemental heating heat exchanger 236 may be configured to receive hydrogen fuel as a first working fluid and as the second working fluid may receive one or more aircraft system fluids, such as, without limitation, engine oil, environmental control system fluids, pneumatic off-takes, or cooled cooling air fluids. As such, the hydrogen fuel will be heated, and the other fluid may be cooled. The hydrogen fuel will then be injected into the combustor 210 through one or more hydrogen fuel injectors, as will be appreciated by those of skill in the art.

When the hydrogen fuel is directed along the hydrogen fuel supply line 226, the hydrogen fuel can pass through a core flow path heat exchanger 300 (e.g., an exhaust waste heat recovery heat exchanger) or other type of heat exchanger. The core flow path heat exchanger 300 is a hydrogen-to-air heat exchanger. In this embodiment, the core flow path heat exchanger 300 is arranged in the core flow path downstream of the combustor 210, and in some embodiments, downstream of the low pressure turbine 214. In this illustrative embodiment, the core flow path heat exchanger 300 is arranged downstream of the low pressure turbine 214 and at or proximate the turbine exhaust case 216 upstream of the outlet 218. In this embodiment, the core flow path heat exchanger 300 is arranged in the core flow path between the low pressure turbine 214 and the high pressure turbine 212. As the hydrogen fuel passes through the core flow path heat exchanger 300, the hydrogen fuel will pick up heat from the exhaust of the turbine engine system 200. As such, the temperature of the hydrogen fuel will be increased.

The heated hydrogen fuel may then be passed into an expansion turbine 234. As the hydrogen fuel passes through the expansion turbine 234 the hydrogen fuel will be expanded. The process of passing the hydrogen fuel through the expansion turbine 234 cools the hydrogen fuel and extracts useful power through the expansion process. Because the hydrogen fuel is heated from a cryogenic or liquid state in the hydrogen fuel tank 224 through the various mechanisms along the hydrogen fuel supply line 226, combustion efficiency may be improved.

Advantageously, embodiments of the present disclosure are directed to improved turbine engine systems that employ non-hydrocarbon fuels at cryogenic temperatures. In accordance with some embodiments, the systems described herein provide for a hydrogen-burning turbine engine that may allow the cryogenic fuel to recover heat from various systems such as waste heat-heat exchangers, system component heat exchangers, and expansion turbines. Accordingly, improved propulsion systems that burn hydrogen fuel and implement improved cooling schemes in both aircraft systems and engine systems are provided.

Figure 3:
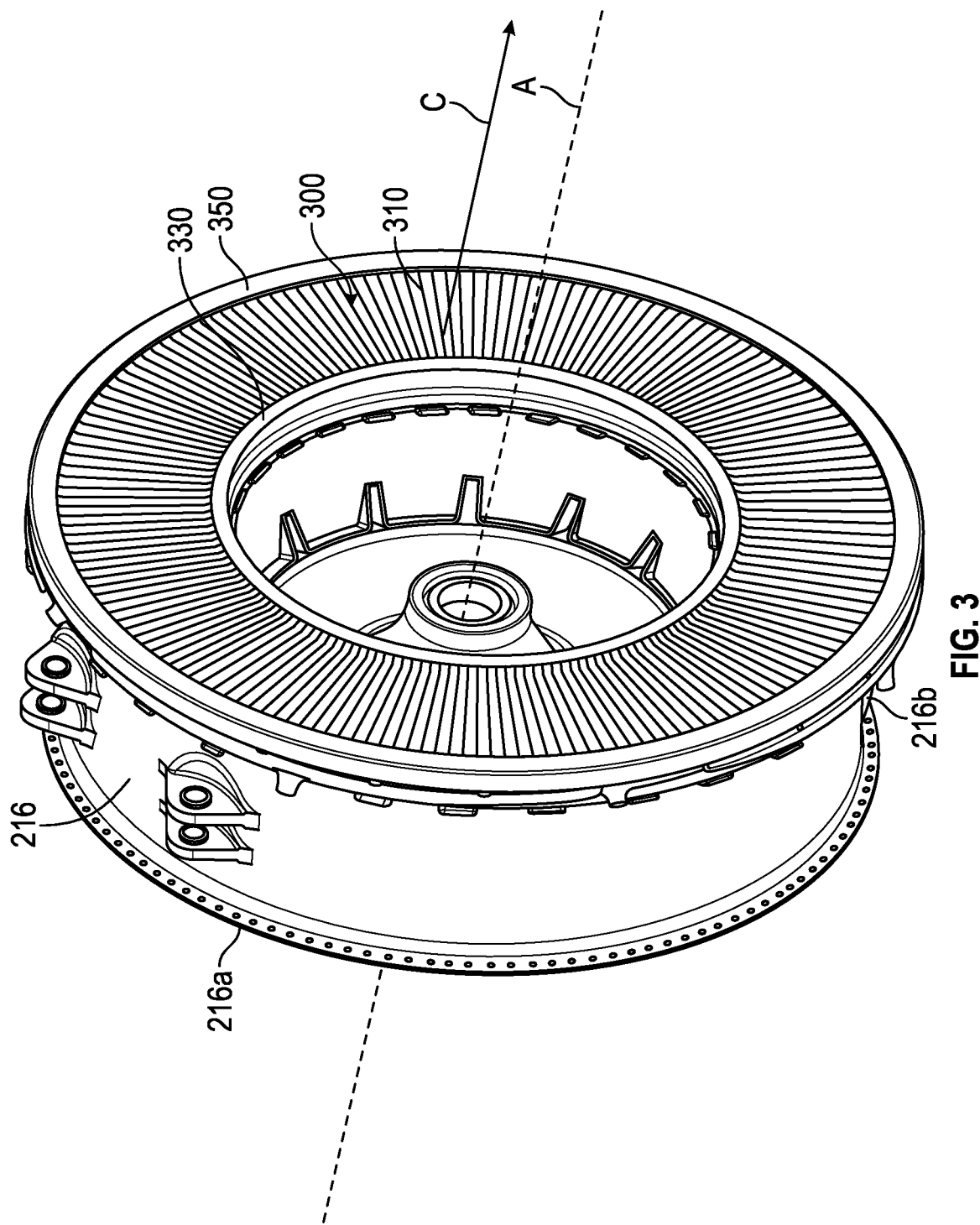
FIG. 3 is an isometric rear view illustration of the turbine exhaust case of the turbine engine system in accordance with an embodiment of the present disclosure.

Referring now to FIG. 3, an isometric rear view of the turbine exhaust case 216 of the turbine engine system 200 is illustrated, in accordance with an embodiment of the present disclosure. The turbine exhaust case 216 includes the core flow path heat exchanger 300. The turbine exhaust case 216 include a forward side 216a and an aft side 216b located aft of the forward side 216a as measured along the engine central longitudinal axis A.

As used herein the terms forward and aft-ward (or aft) is intended to be a direction that the surface is oriented within the 200 along the engine central longitudinal axis A when the component is installed. The term forward denotes that the surface is oriented or facing towards the forward end of the turbine engine system 200 when the component is installed.

The forward end is at the inlet 202 of the turbine engine system 200. The term aft or aft-ward denotes that the surface is oriented or facing towards the aft end of the turbine engine system 200 when the component is installed. The aft end is at the outlet 218 of the turbine engine system 200.

The core flow path heat exchanger 300 includes a plurality of heat transfer tubes 310 extending across the core flow path C of the turbine engine system 200. The heat transfer tubes 310 extend from a radially inward plenum assembly 330 to a radially outward plenum assembly 350 across the core flow path C. The radially outward plenum assembly 350 is located radially outward of the radially inward plenum assembly 330. As used herein radially outward is intended to be in the direction away from the engine central longitudinal axis A. Each heat transfer tube 310 is configured to convey hydrogen fuel within the heat transfer tube 310 across the core flow path C of the turbine engine system 200. The hydrogen fuel is configured to absorb heat from the core flow path C through the heat transfer tube 310 while traversing the core flow path C within the heat transfer tube 310. In one embodiment, the core flow path heat exchanger 300 may be a multi-pass heat exchanger, such that the hydrogen fuel may traverse the core flow path C a single time within the core flow path heat exchanger 300. In another embodiment, the core flow path heat exchanger 300 may be a multi-pass heat exchanger, such that the hydrogen fuel may traverse the core flow path C multiple times within the core flow path heat exchanger 300.

Figure 4:
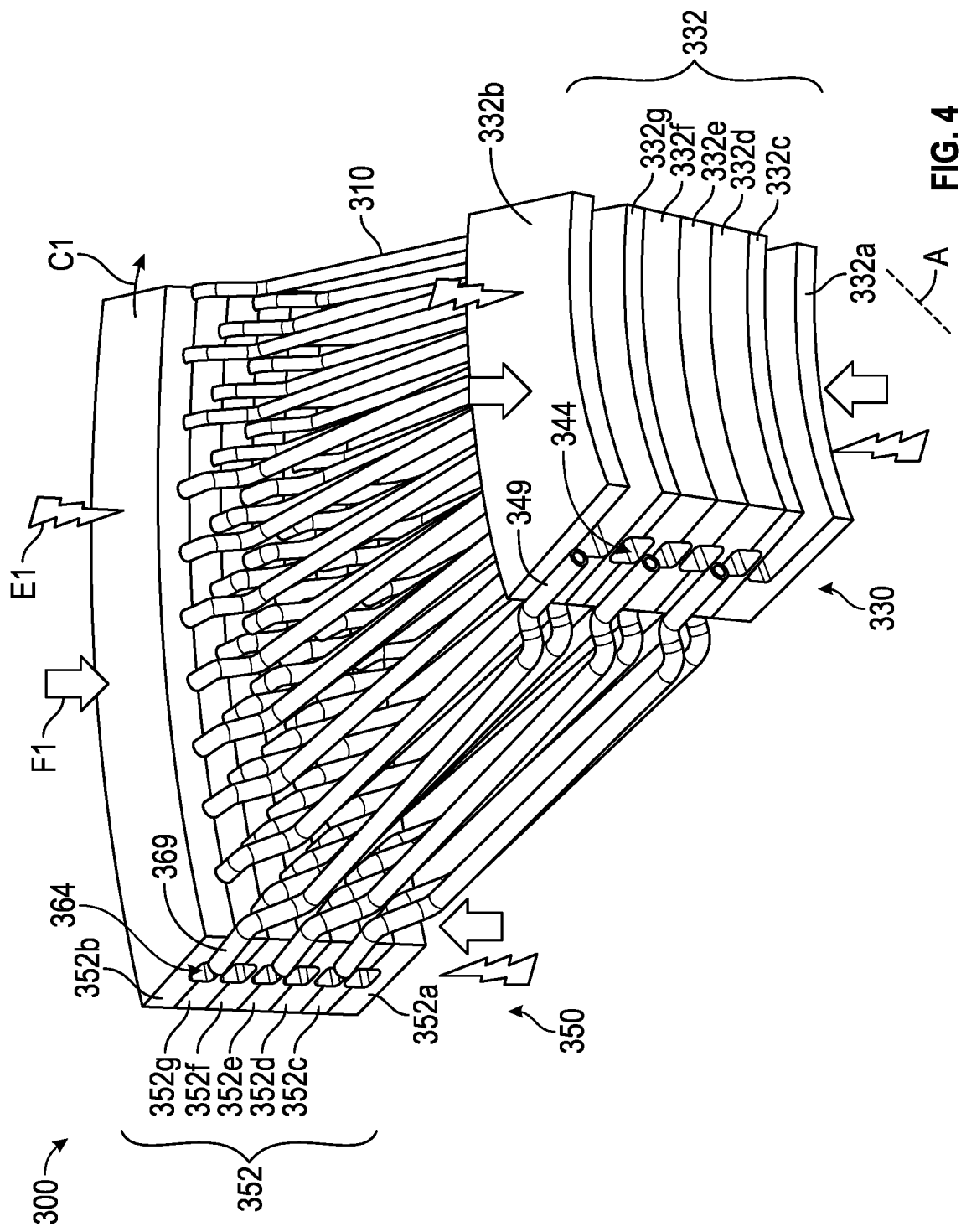
FIG. 4 is an isometric cross-sectional illustration of the core flow path heat exchanger in accordance with an embodiment of the present disclosure.

Referring now to FIG. 4, an isometric cross-sectional view of the core flow path heat exchanger 300 is illustrated, in accordance with an embodiment of the present disclosure. The core flow path heat exchanger 300 includes the radially outward plenum assembly 350 and the radially inward plenum assembly 330.

The radially outward plenum assembly 350 includes a plurality of radially outward plenum layers 352. As illustrated in FIG. 4, there may be seven radially outward plenum layers 352. It is understood however, that the radially outward plenum assembly 350 is not limited to seven radially outward plenum layers 352 and the radially outward plenum assembly 350 may have more or less than seven radially outward plenum layers 352.

The radially outward plenum assembly 350 includes a radially outward plenum 364 formed between each of the plurality of radially outward plenum layers 352. The radially outward plenum 364 is configured to convey the hydrogen fuel to the plurality of heat transfer tubes 310 or receive the hydrogen fuel from the plurality of heat transfer tubes 310. The radially outward plenum 364 extends circumferentially C1 around the engine central longitudinal axis A of the turbine engine system 200. The radially outward plenum 364 may be fluidly connected to other radially outward plenum 364 through one or more radially outward plenum orifices 368 (See FIG. 9). The radially outward plenum assembly 350 includes a radially outward tube receiving orifice 369 formed between each of the radially outward plenum layers 352. The radially outward tube receiving orifice 369 is configured to receive therein a heat transfer tube 310 of the plurality of heat transfer tubes 310. The radially outward tube receiving orifice 369 is fluidly coupled to the radially outward plenum 364.

The radially outward plenum layers 352 include a forward radially outward layer 352a and an aft-ward radially outward layer 352b. Located between the forward radially outward layer 352a and the aft-ward radially outward layer 352b may be a first radially outward interposed layer 352c, a second radially outward interposed layer 352d, a third radially outward interposed layer 352e, a fourth radially outward interposed layer 352f, and a fifth radially outward interposed layer 352g.

The radially inward plenum assembly 330 includes a plurality of radially inward plenum layers 332. As illustrated in FIG. 4, there may be seven radially inward plenum layers 332. It is understood however, that the radially inward plenum assembly 330 is not limited to seven radially inward plenum layers 332 and the radially inward plenum assembly 330 may have more or less than seven radially inward plenum layers 332.

The radially inward plenum assembly 330 includes a radially inward plenum 344 formed between each of the plurality of radially inward plenum layers 332. The radially inward plenum 344 is configured to convey the hydrogen fuel to the plurality of heat transfer tubes 310 or receive the hydrogen fuel from the plurality of heat transfer tubes 310. The radially inward plenum 344 extends circumferentially C1 around the engine central longitudinal axis A of the turbine engine system 200. The radially inward plenum 344 may be fluidly connected to other radially inward plenum 344 through one or more radially inward plenum orifices 348 (See FIG. 10). The radially inward plenum assembly 330 includes a radially inward tube receiving orifice 349 formed between each of the radially inward plenum layers 332. The radially inward tube receiving orifice 349 is configured to receive therein a heat transfer tube 310 of the plurality of heat transfer tubes 310. The radially inward tube receiving orifice 349 is fluidly coupled to the radially inward plenum 344.

The radially inward plenum layers 332 include a forward radially inward layer 332a and an aft-ward radially inward layer 332b. Located between the forward radially inward layer 332a and the aft-ward radially inward layer 332b may be a first radially inward interposed layer 332c, a second radially inward interposed layer 332d, a third radially inward interposed layer 332e, a fourth radially inward interposed layer 332f, and a fifth radially inward interposed layer 332g.

During a FSA or SPS assembly of the core flow path heat exchanger 300 a force or load F1 is applied to the forward radially outward layer 352a, the aft-ward radially outward layer 352b, the forward radially inward layer 332a, and the aft-ward radially inward layer 332b to compress the core flow path heat exchanger 300 together. While the core flow path heat exchanger 300 is under compression a high amperage pulsed DC electrical current E1 is applied to the core flow path heat exchanger 300. The electrical current heats the materials to be bonded through Joule heating while under uniaxial compression. The consolidation of the materials within the core flow path heat exchanger 300 is a combination of solid-state transport mechanisms including primarily diffusion and creep. The electrical current E1 is applied simultaneously to the load F1.

Figure 5:
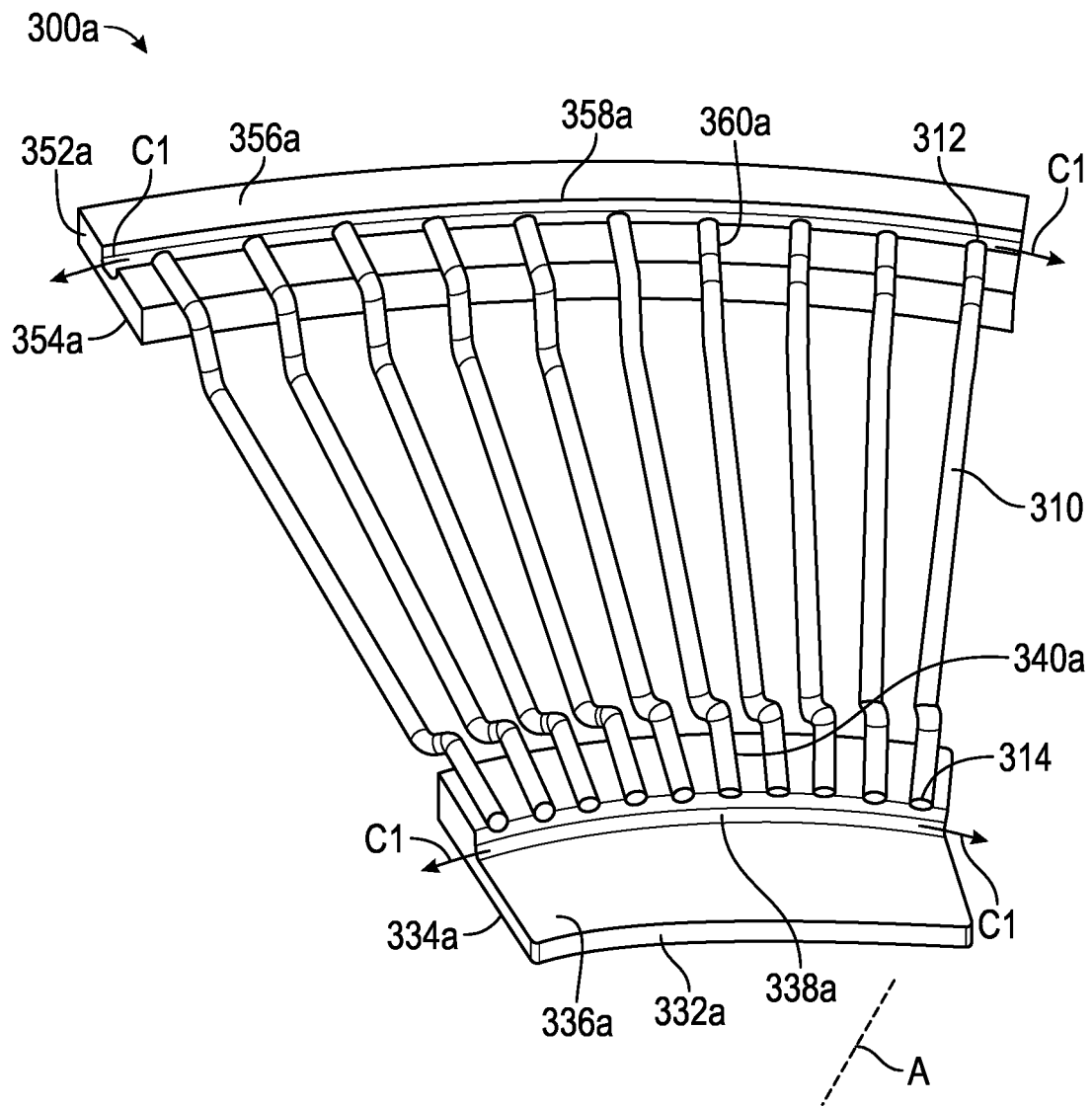
FIG. 5 is an isometric cross-sectional illustration of a forward layer of the core flow path heat exchanger in accordance with an embodiment of the present disclosure.

Referring now to FIG. 5, an isometric cross-sectional view of a forward layer 300a of the core flow path heat exchanger 300 is illustrated, in accordance with an embodiment of the present disclosure. The forward layer 300a includes the forward radially inward layer 332a and the forward radially outward layer 352a.

The forward radially outward layer 352a includes a forward radially outward side 354a and an aft-ward radially outward side 356a located opposite and aft of the forward radially outward side 354a. The aft-ward radially outward side 356a includes an aft-ward radially outward groove 358a that extends circumferentially C1 around the central longitudinal axis A. The aft-ward radially outward groove 358a is configured to align with a forward radially outward groove 362 of an adjacent layer to form a radially outward plenum 364 (see FIG. 4) in the radially outward plenum assembly 350. The aft-ward radially outward side 356a also includes a plurality of aft-ward radially outward tube grooves 360a. The aft-ward radially outward tube grooves 360a are oriented about perpendicular to the aft-ward radially outward groove 358a and point radially towards the engine central longitudinal axis A. The heat transfer tube 310 includes a radially outward end 312 and a radially inward end 314. The radially outward end 312 is configured to fit within the aft-ward radially outward tube grooves 360a. The heat transfer tube 310 fluidly connects to the aft-ward radially outward groove 358a at the radially outward end 312. The forward radially outward side 354a may be flat with no groove.

The forward radially inward layer 332a includes a forward radially inward side 334a and an aft-ward radially inward side 336a located opposite and aft of the forward radially inward side 334a. The aft-ward radially inward side 336a includes an aft-ward radially inward groove 338a that extends circumferentially C1 around the central longitudinal axis A. The aft-ward radially inward groove 338a is configured to align with a forward radially inward groove 342 of an adjacent layer to form a radially inward plenum 344 (See FIG. 4) in the radially inward plenum assembly 330. The aft-ward radially inward side 336a also includes a plurality of aft-ward radially inward tube grooves 340a. The aft-ward radially inward tube grooves 340a are oriented about perpendicular to the aft-ward radially inward groove 338a and point radially towards the engine central longitudinal axis A. The radially inward end 314 is configured to fit within the aft-ward radially inward tube grooves 340a. The heat transfer tube 310 fluidly connects to the aft-ward radially inward groove 338a at the radially inward end 314. The forward radially inward side 334a may be flat with no groove.

Figure 6:
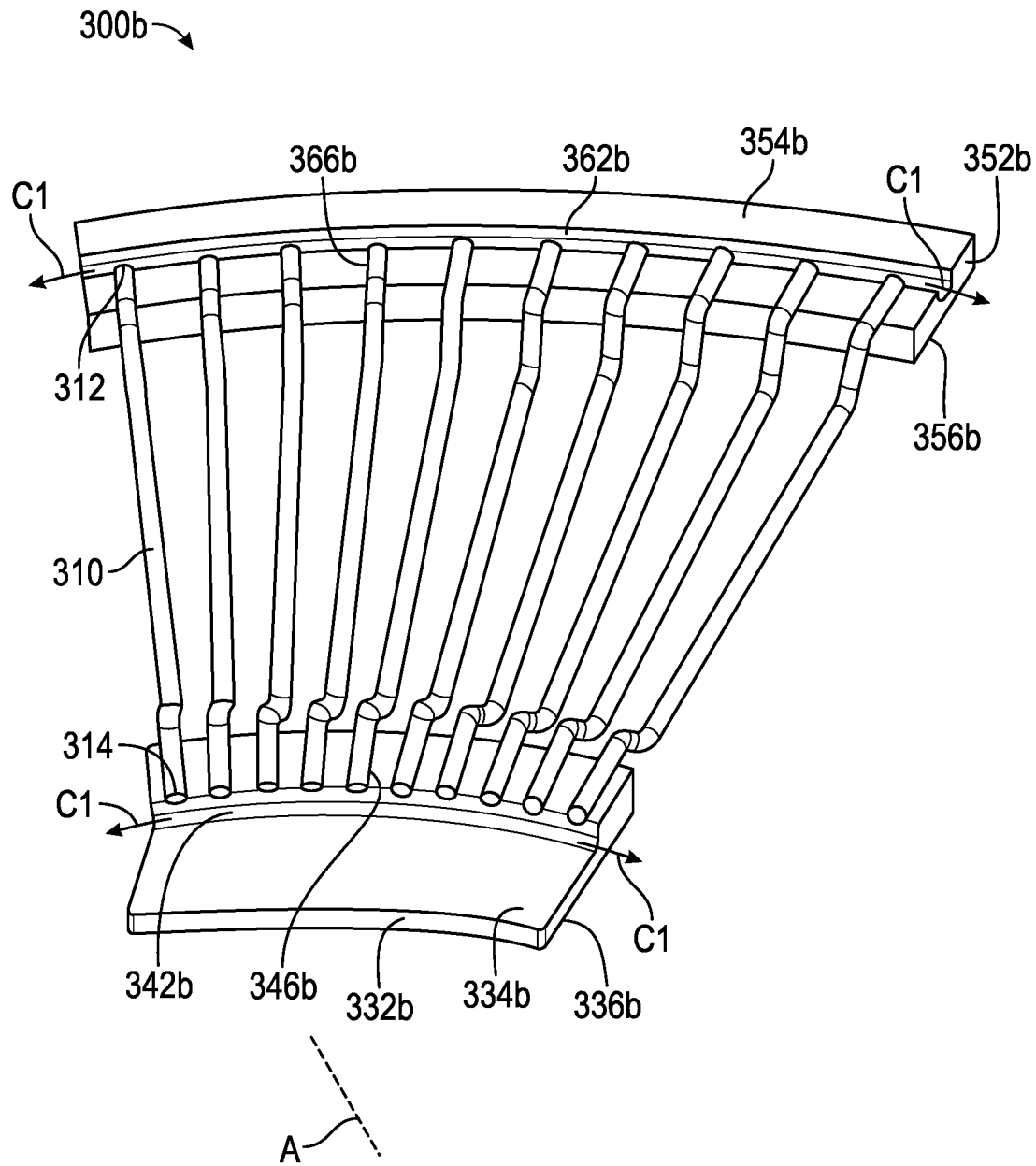
FIG. 6 is an isometric cross-sectional illustration of an aft layer of the core flow path heat exchanger in accordance with an embodiment of the present disclosure.

Referring now to FIG. 6, an isometric cross-sectional view of an aft layer 300b of the core flow path heat exchanger 300 is illustrated, in accordance with an embodiment of the present disclosure. The aft layer 300b includes the aft-ward radially inward layer 332b and the aft-ward radially outward layer 352b.

The aft-ward radially outward layer 352b includes a forward radially outward side 354b and an aft-ward radially outward side 356b located opposite and aft of the forward radially outward side 354b. The forward radially outward side 354b includes a forward radially outward groove 362b that extends circumferentially C1 around the central longitudinal axis A. The forward radially outward groove 362b is configured to align with an aft-ward radially outward groove 358 of an adjacent layer to form a radially outward plenum 364 (see FIG. 4) in the radially outward plenum assembly 350. The forward radially outward side 354b also includes a plurality of forward radially outward tube grooves 366b. The forward radially outward tube grooves 366b are oriented about perpendicular to the forward radially outward groove 362b and point radially towards the engine central longitudinal axis A. The radially outward end 312 is configured to fit within the forward radially outward tube grooves 366b. The heat transfer tube 310 fluidly connects to the forward radially outward groove 362b at the radially outward end 312. The aft-ward radially outward side 356b may be flat with no groove.

The aft-ward radially inward layer 332b includes a forward radially inward side 334b and an aft-ward radially inward side 336b located opposite and aft of the forward radially inward side 334b. The forward radially inward side 334b includes a forward radially inward groove 342b that extends circumferentially C1 around the central longitudinal axis A. The forward radially inward groove 342b is configured to align with an aft-ward radially inward groove 338 of an adjacent layer to form a radially inward plenum 344 (see FIG. 4) in the radially inward plenum assembly 330. The forward radially inward side 334b also includes a plurality of forward radially inward tube grooves 346b. The forward radially inward tube grooves 346b are oriented about perpendicular to the forward radially inward groove 342b and point radially towards the engine central longitudinal axis A. The radially inward end 314 is configured to fit within the forward radially inward tube grooves 346b. The heat transfer tube 310 fluidly connects to the forward radially inward groove 342b at the radially inward end 314. The aft-ward radially inward side 336b may be flat with no groove.

Figure 7:
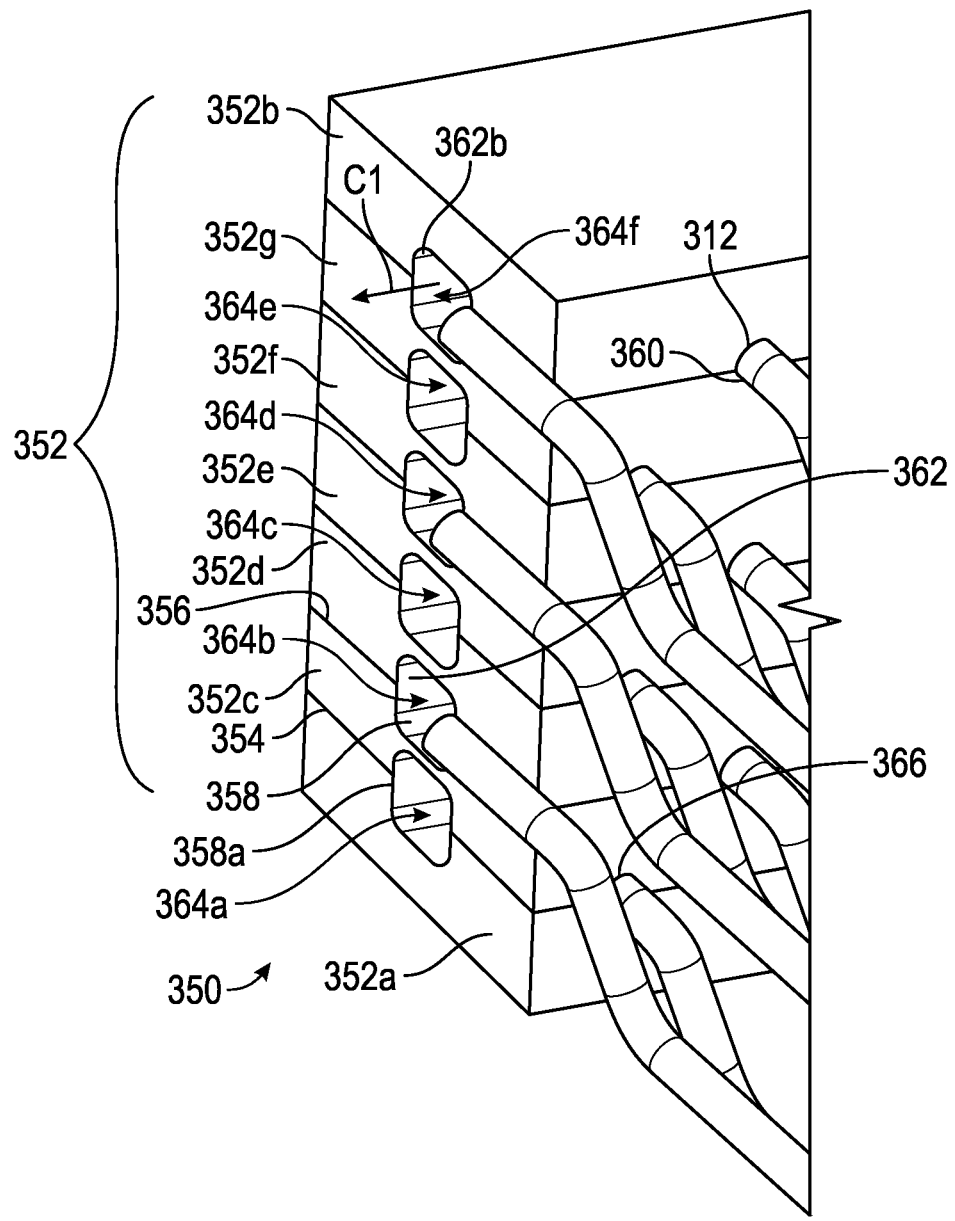
FIG. 7 is an isometric cross-sectional illustration of the radially outward plenum layers in accordance with an embodiment of the present disclosure.

Referring now to FIG. 7, an isometric cross-sectional view of the radially outward plenum layers 352 is illustrated, in accordance with an embodiment of the present disclosure. Each of the radially outward interposed layers 352c, 352d, 352e, 352f, 352g includes a forward radially outward side 354 and an aft-ward radially outward side 356 located opposite and aft of the forward radially outward side 354. The aft-ward radially outward side 356 includes an aft-ward radially outward groove 358 that extends circumferentially C1 around the central longitudinal axis A. The forward radially outward side 354 includes a forward radially outward groove 362 that extends circumferentially C1 around the central longitudinal axis A.

The forward radially outward groove 362 is configured to align with an aft-ward radially outward groove 358, 358a of an adjacent layer to form a radially outward plenum 364 in the radially outward plenum assembly 350.

The forward radially outward groove 362 of the first radially outward interposed layer 352c is configured to align with the aft-ward radially outward groove 358a of the forward radially outward layer 352a to form a first radially outward plenum 364a in the radially outward plenum assembly 350.

The forward radially outward groove 362 of the second radially outward interposed layer 352d is configured to align with the aft-ward radially outward groove 358 of the first radially outward interposed layer 352c to form a second radially outward plenum 364b in the radially outward plenum assembly 350.

The forward radially outward groove 362 of the third radially outward interposed layer 352e is configured to align with the aft-ward radially outward groove 358 of the second radially outward interposed layer 352d to form a third radially outward plenum 364c in the radially outward plenum assembly 350.

The forward radially outward groove 362 of the fourth radially outward interposed layer 352f is configured to align with the aft-ward radially outward groove 358 of the third radially outward interposed layer 352e to form a fourth radially outward plenum 364d in the radially outward plenum assembly 350.

The forward radially outward groove 362 of the fifth radially outward interposed layer 352g is configured to align with the aft-ward radially outward groove 358 of the fourth radially outward interposed layer 352f to form a fifth radially outward plenum 364e in the radially outward plenum assembly 350.

The forward radially outward groove 362b of the aft-ward radially outward layer 352b is configured to align with the aft-ward radially outward groove 358 of the fifth radially outward interposed layer 352g to form a sixth radially outward plenum 364f in the radially outward plenum assembly 350.

The forward radially outward side 354 also includes a plurality of forward radially outward tube grooves 366. The forward radially outward tube grooves 366 are oriented about perpendicular to the forward radially outward groove 362 and point radially towards the engine central longitudinal axis A. The radially outward end 312 of the heat transfer tube 310 is configured to fit within the forward radially outward tube grooves 366. The heat transfer tube 310 fluidly connects to the forward radially outward groove 362b at the radially outward end 312.

The aft-ward radially outward side 356 also includes a plurality of aft-ward radially outward tube grooves 360. The aft-ward radially outward tube grooves 360 are oriented about perpendicular to the aft-ward radially outward groove 358 and point radially towards the engine central longitudinal axis A. The radially outward end 312 of the heat transfer tube 310 is configured to fit within the aft-ward radially outward tube grooves 360. The heat transfer tube 310 fluidly connects to the forward radially outward groove 362b at the radially outward end 312.

The forward radially outward tube grooves 366 are configured to align with the aft-ward radially outward tube grooves 360 of an adjacent layer to form a radially outward tube receiving orifice 369 to contain the radially outward end 312 of the heat transfer tube 310 therein.

The forward radially outward tube grooves 366 of the first radially outward interposed layer 352c are configured to align with the aft-ward radially outward tube grooves 360a of the forward radially outward layer 352a to form a radially outward tube receiving orifice 369 to contain the radially outward end 312 of the heat transfer tube 310 therein.

The forward radially outward tube grooves 366 of the second radially outward interposed layer 352d are configured to align with the aft-ward radially outward tube grooves 360 of the first radially outward interposed layer 352c to form a radially outward tube receiving orifice 369 to contain the radially outward end 312 of the heat transfer tube 310 therein.

The forward radially outward tube grooves 366 of the third radially outward interposed layer 352e are configured to align with the aft-ward radially outward tube grooves 360 of the second radially outward interposed layer 352d to form a radially outward tube receiving orifice 369 to contain the radially outward end 312 of the heat transfer tube 310 therein.

The forward radially outward tube grooves 366 of the fourth radially outward interposed layer 352f are configured to align with the aft-ward radially outward tube grooves 360 of the third radially outward interposed layer 352e to form a radially outward tube receiving orifice 369 to contain the radially outward end 312 of the heat transfer tube 310 therein.

The forward radially outward tube grooves 366 of the fifth radially outward interposed layer 352g are configured to align with the aft-ward radially outward tube grooves 360 of the fourth radially outward interposed layer 352f to form a radially outward tube receiving orifice 369 to contain the radially outward end 312 of the heat transfer tube 310 therein.

The forward radially outward tube grooves 366 of the aft-ward radially outward layer 352b are configured to align with the aft-ward radially outward tube grooves 360 of the fifth radially outward interposed layer 352g to form a radially outward tube receiving orifice 369 to contain the radially outward end 312 of the heat transfer tube 310 therein.

Figure 8:
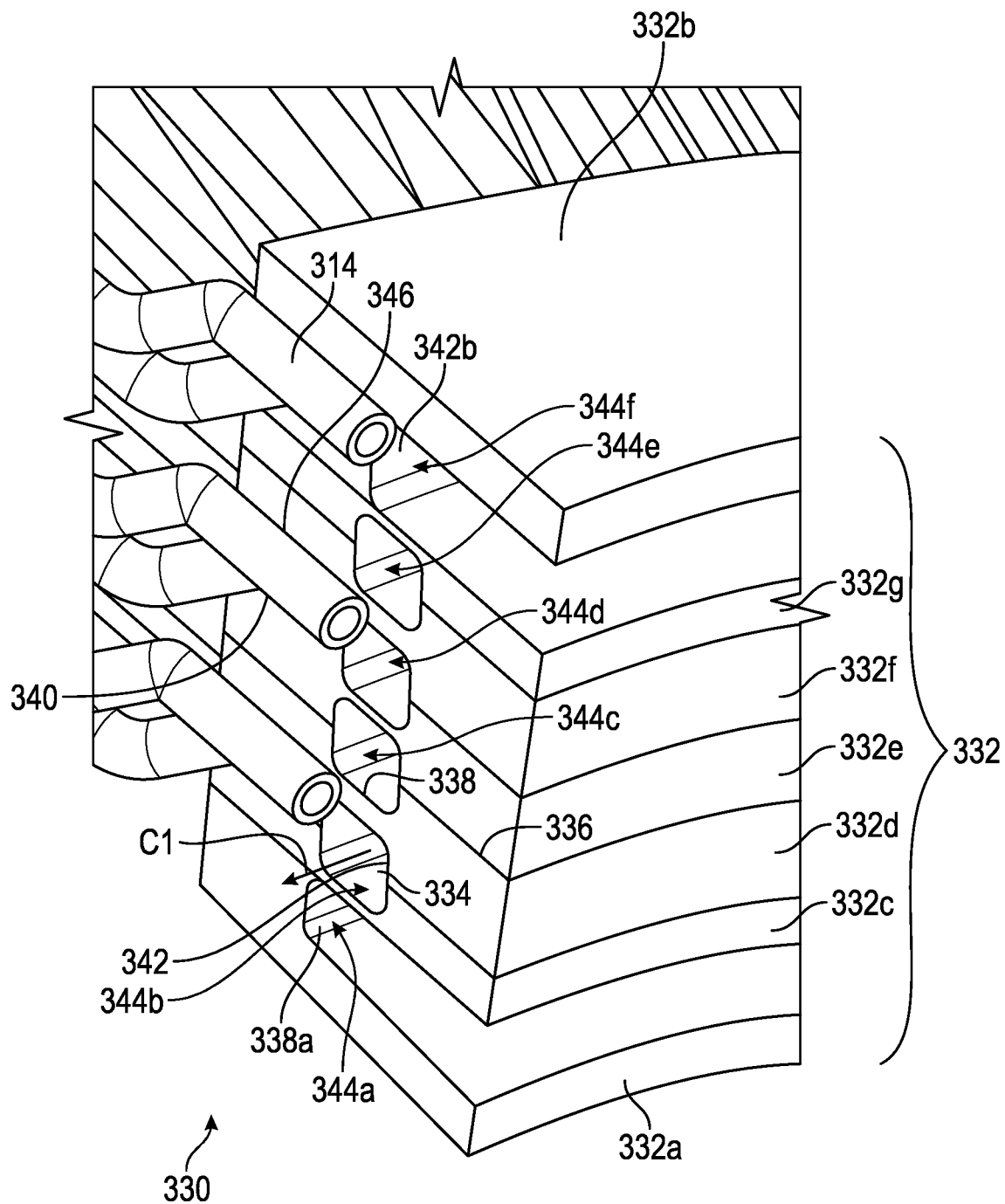
FIG. 8 is an isometric cross-sectional illustration of the radially inward plenum layers in accordance with an embodiment of the present disclosure.

Referring now to FIG. 8, an isometric cross-sectional view of the radially inward plenum layers 332 are illustrated, in accordance with an embodiment of the present disclosure. Each of the radially inward interposed layers 332c, 332d, 332e, 332f, 332g includes a forward radially inward side 334 and an aft-ward radially inward side 336 located opposite and aft of the forward radially inward side 334. The aft-ward radially inward side 336 includes an aft-ward radially inward groove 338 that extends circumferentially C1 around the central longitudinal axis A. The forward radially inward side 334 includes a forward radially inward groove 342 that extends circumferentially C1 around the central longitudinal axis A.

The forward radially inward groove 342 is configured to align with an aft-ward radially inward groove 338, 338a of an adjacent layer to form a radially inward plenum 344 in the radially inward plenum assembly 330.

The forward radially inward groove 342 of the first radially inward interposed layer 332c is configured to align with the aft-ward radially inward groove 338a of the forward radially inward layer 332a to form a first radially inward plenum 344a in the radially inward plenum assembly 330.

The forward radially inward groove 342 of the second radially inward interposed layer 332d is configured to align with the aft-ward radially inward groove 338 of the first radially inward interposed layer 332c to form a second radially inward plenum 344b in the radially inward plenum assembly 330.

The forward radially inward groove 342 of the third radially inward interposed layer 332e is configured to align with the aft-ward radially inward groove 338 of the second radially inward interposed layer 332d to form a third radially inward plenum 344c in the radially inward plenum assembly 330.

The forward radially inward groove 342 of the fourth radially inward interposed layer 332f is configured to align with the aft-ward radially inward groove 338 of the third radially inward interposed layer 332e to form a fourth radially inward plenum 344d in the radially inward plenum assembly 330.

The forward radially inward groove 342 of the fifth radially inward interposed layer 332g is configured to align with the aft-ward radially inward groove 338 of the fourth radially inward interposed layer 332f to form a fifth radially inward plenum 344e in the radially inward plenum assembly 330.

The forward radially inward groove 342b of the aft-ward radially inward layer 332b is configured to align with the aft-ward radially inward groove 338 of the fifth radially inward interposed layer 332g to form a sixth radially inward plenum 344f in the radially inward plenum assembly 330.

The forward radially inward side 334 also includes a plurality of forward radially inward tube grooves 346. The forward radially inward tube grooves 346 are oriented about perpendicular to the forward radially inward groove 342 and point radially towards the engine central longitudinal axis A. The radially inward end 314 of the heat transfer tube 310 is configured to fit within the forward radially inward tube grooves 346. The heat transfer tube 310 fluidly connects to the forward radially inward groove 342b at the radially inward end 314.

The aft-ward radially inward side 336 also includes a plurality of aft-ward radially inward tube grooves 340. The aft-ward radially inward tube grooves 340 are oriented about perpendicular to the aft-ward radially inward groove 338 and point radially towards the engine central longitudinal axis A. The radially inward end 314 of the heat transfer tube 310 is configured to fit within the aft-ward radially inward tube grooves 340. The heat transfer tube 310 fluidly connects to the forward radially inward groove 342b at the radially inward end 314.

The forward radially inward tube grooves 346 are configured to align with the aft-ward radially inward tube grooves 340 of an adjacent layer to form a radially inward tube receiving orifice 349 to form a radially inward tube receiving orifice 349 to contain the radially inward end 314 of the heat transfer tube 310 therein.

The forward radially inward tube grooves 346 of the first radially inward interposed layer 332c are configured to align with the aft-ward radially inward tube grooves 340a of the forward radially inward layer 332a to form a radially inward tube receiving orifice 349 to contain the radially inward end 314 of the heat transfer tube 310 therein.

The forward radially inward tube grooves 346 of the second radially inward interposed layer 332d are configured to align with the aft-ward radially inward tube grooves 340 of the first radially inward interposed layer 332c to form a radially inward tube receiving orifice 349 to contain the radially inward end 314 of the heat transfer tube 310 therein.

The forward radially inward tube grooves 346 of the third radially inward interposed layer 332e are configured to align with the aft-ward radially inward tube grooves 340 of the second radially inward interposed layer 332d to form a radially inward tube receiving orifice 349 to contain the radially inward end 314 of the heat transfer tube 310 therein.

The forward radially inward tube grooves 346 of the fourth radially inward interposed layer 332f are configured to align with the aft-ward radially inward tube grooves 340 of the third radially inward interposed layer 332e to form a radially inward tube receiving orifice 349 to contain the radially inward end 314 of the heat transfer tube 310 therein.

The forward radially inward tube grooves 346 of the fifth radially inward interposed layer 332g are configured to align with the aft-ward radially inward tube grooves 340 of the fourth radially inward interposed layer 332f to form a radially inward tube receiving orifice 349 to contain the radially inward end 314 of the heat transfer tube 310 therein.

The forward radially inward tube grooves 346 of the aft-ward radially inward layer 332b are configured to align with the aft-ward radially inward tube grooves 340 of the fifth radially inward interposed layer 332g to form a radially inward tube receiving orifice 349 to contain the radially inward end 314 of the heat transfer tube 310 therein.

Figure 9:
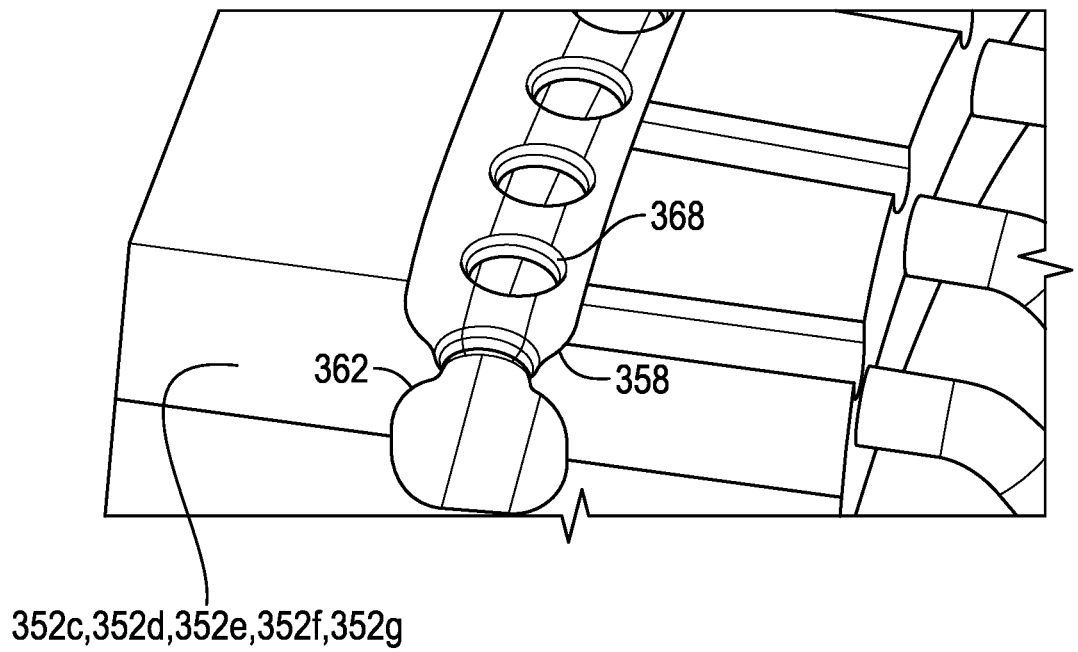
FIG. 9 is an isometric cross-sectional illustration of the radially outward interposed layers in accordance with an embodiment of the present disclosure.

Referring now to FIG. 9, an isometric cross-sectional view of the radially outward interposed layers 352c, 352d, 352e, 352f, 352g is illustrated, in accordance with an embodiment of the present disclosure. Each of the radially outward interposed layers 352c, 352d, 352e, 352f, 352g may include a radially outward plenum orifice 368 fluidly connecting the forward radially outward groove 362 to the aft-ward radially outward groove 358. The radially outward plenum orifice 368 may be located in the forward radially outward groove 362 and the aft-ward radially outward groove 358.

Figure 10:
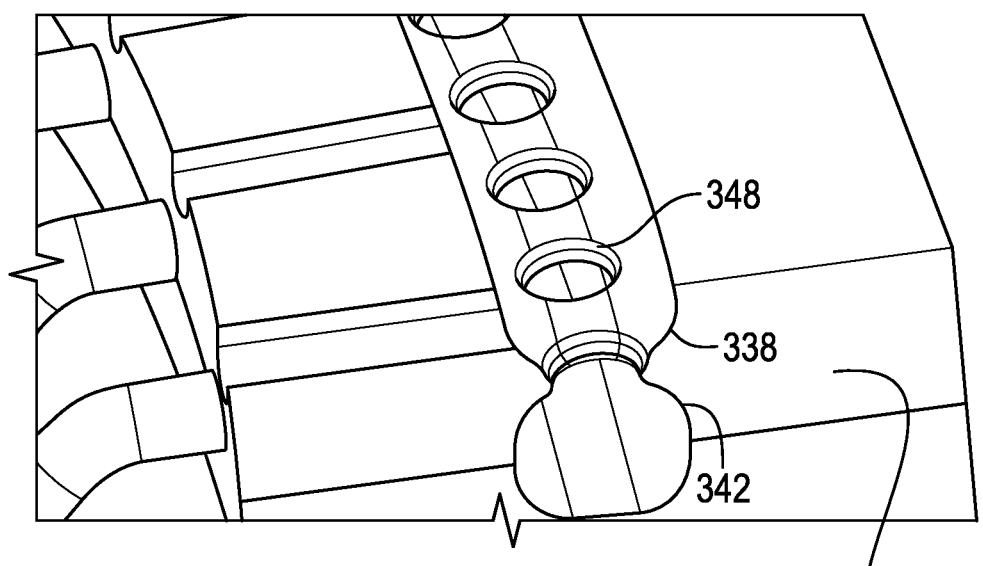
FIG. 10 is an isometric cross-sectional illustration of the radially inward interposed layers in accordance with an embodiment of the present disclosure.

Referring now to FIG. 10, an isometric cross-sectional view of the radially inward interposed layers 332c, 332d, 332e, 332f, 332g is illustrated, in accordance with an embodiment of the present disclosure. Each of the radially inward interposed layers 332c, 332d, 332e, 332f, 332g may include a radially inward plenum orifice 348 fluidly connecting the forward radially inward groove 342 to the aft-ward radially inward groove 338. The radially inward plenum orifice 348 may be located in the forward radially inward groove 342 and the aft-ward radially inward groove 338.

Figure 11:
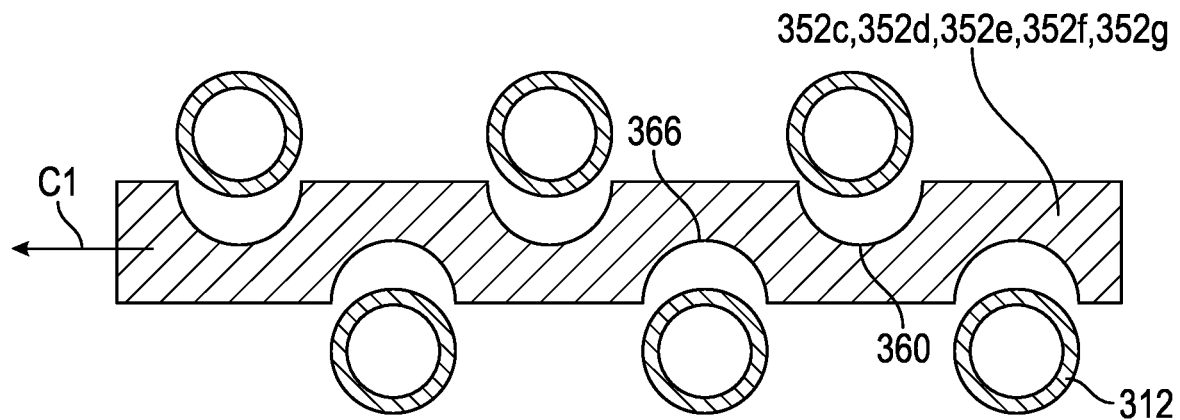
FIG. 11 is a cross-sectional illustration of the radially outward interposed layers in accordance with an embodiment of the present disclosure.

Referring now to FIG. 11, a cross-sectional view of the radially outward interposed layers 352c, 352d, 352e, 352f, 352g is illustrated, in accordance with an embodiment of the present disclosure. Each of the radially outward interposed layers 352c, 352d, 352e, 352f, 352g include the forward radially outward tube grooves 366 and the aft-ward radially outward tube grooves 360 configured to fit the radially outward end 312 of the heat transfer tubes 310. The forward radially outward tube grooves 366 may be staggered circumferentially with the aft-ward radially outward tube grooves 360 as illustrated in FIG. 11.

Figure 12:
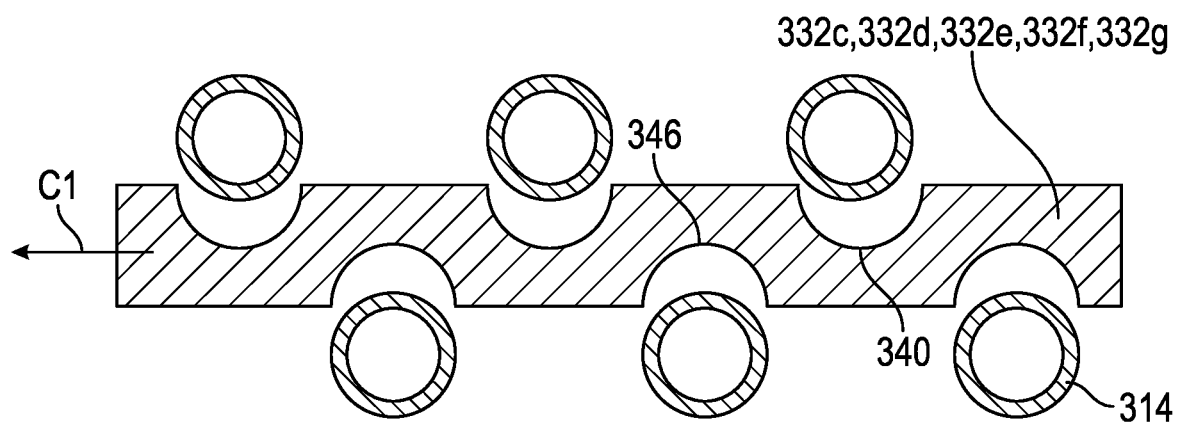
FIG. 12 is a cross-sectional illustration of the radially inward interposed layers in accordance with an embodiment of the present disclosure.

Referring now to FIG. 12, a cross-sectional view of the radially inward interposed layers 332c, 332d, 332e, 332f, 332g is illustrated, in accordance with an embodiment of the present disclosure. Each of the radially inward interposed layers 332c, 332d, 332e, 332f, 332g include the forward radially inward tube grooves 346 and the aft-ward radially inward tube grooves 340 configured to fit the radially inward end 314 of the heat transfer tubes 310. The forward radially inward tube grooves 346 may be staggered circumferentially with the aft-ward radially inward tube grooves 340 as illustrated in FIG. 12.

Figure 13:
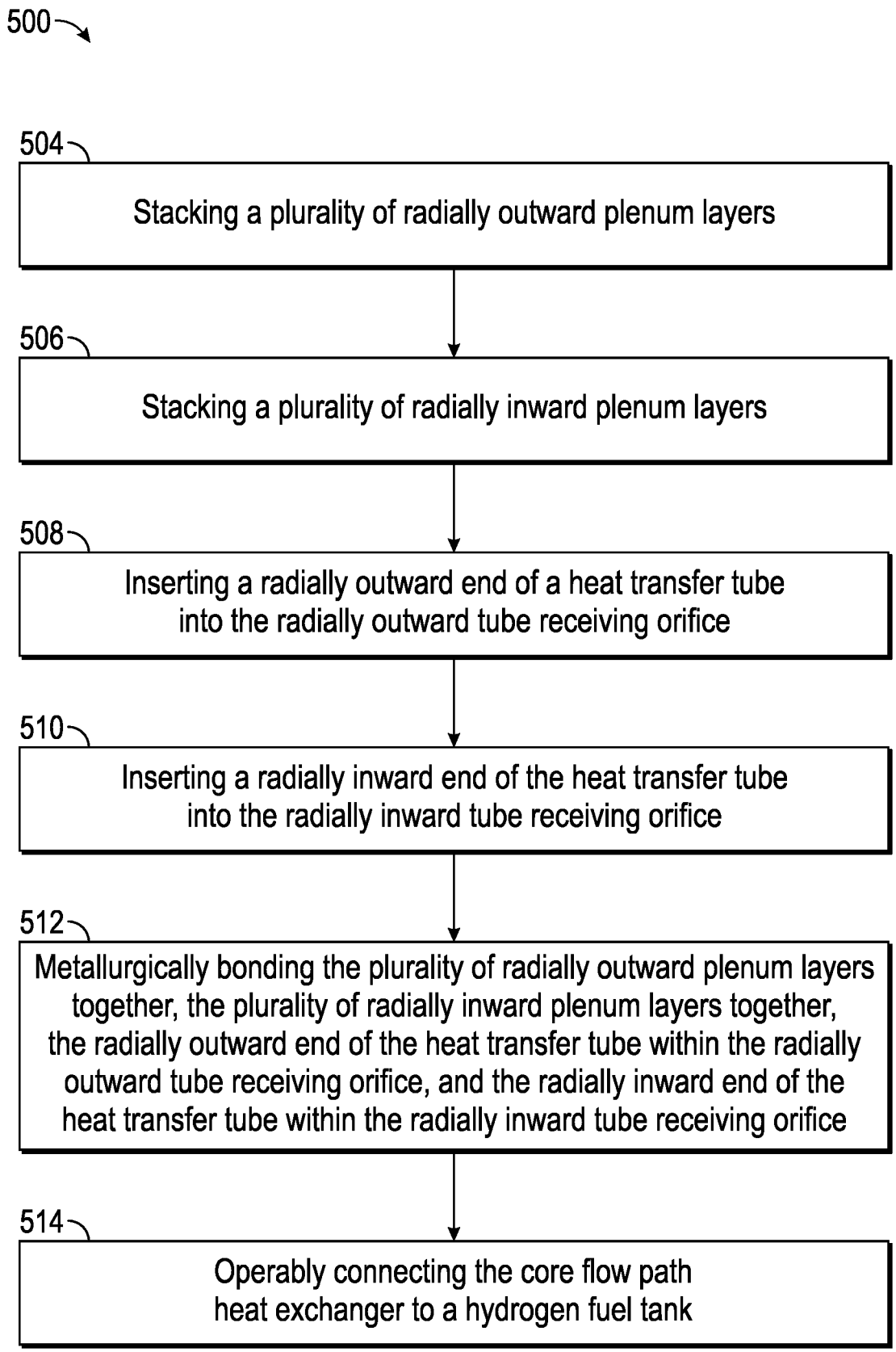
FIG. 13 is a flow diagram illustrating a method of assembling the core flow path heat exchanger for a turbine engine system in accordance with an embodiment of the present disclosure.

Referring now to FIG. 13, with continued reference to FIGS. 2-12, a method 500 of assembling the core flow path heat exchanger 300 for a turbine engine system 200 is illustrated in accordance with an embodiment of the present disclosure.

At block 504, a plurality of radially outward plenum layers 352 are stacked on top of each other. A radially outward plenum 364 is formed between each of the plurality of radially outward plenum layers 352 when stacked. A radially outward tube receiving orifice 369 is formed between each of the plurality of radially outward plenum layers 352 when stacked.

At block 506, a plurality of radially inward plenum layers 332 are stacked on top of each other. A radially inward plenum 344 is formed between each of the plurality of radially inward plenum layers 332 when stacked. A radially inward tube receiving orifice 349 is formed between each of the plurality of radially inward plenum layers 332 when stacked.

At block 508, a radially outward end 312 of a heat transfer tube 310 is inserted into the radially outward tube receiving orifice 369. The radially outward end 312 of a heat transfer tube 310 may inserted into the radially outward tube receiving orifice 369, while the plurality of radially inward plenum layers 332 are being stacked. For example, the radially outward end 312 of a heat transfer tube 310 is inserted into the radially outward tube receiving orifice 369 in between the stacking of each of the plurality of radially inward plenum layers 332.

At block 510, a radially inward end 314 of a heat transfer tube 310 is inserted into the radially inward tube receiving orifice 349. The radially inward end 314 of a heat transfer tube 310 may inserted into the radially inward tube receiving orifice 349, while the plurality of radially inward plenum layers 332 are being stacked. For example, the radially inward end 314 of a heat transfer tube 310 is inserted into the radially inward tube receiving orifice 349 in between the stacking of each of the plurality of radially inward plenum layers 332.

At block 512, the plurality of radially outward plenum layers 352 are metallurgically bonded together, the plurality of radially inward plenum layers 332 are metallurgically bonded together, the radially outward end 312 of the heat transfer tube 310 is metallurgically bonded within the radially outward tube receiving orifice 369, and the radially inward end 314 of the heat transfer tube 310 is metallurgically bonded within the radially inward tube receiving orifice 349. The metallurgically bonding of block 512 can be preceded by an operation of preparing surfaces of the components for the metallurgically bonding by, for example, surface machining and/or cleaning that provides for good contact-making bonding surfaces. In an embodiment, the metallurgically bonding can include at least one of FAST and SPS. In an embodiment, the metallurgically bonding can include applying a load F1 to compress the plurality of radially outward plenum layers 352 together, the plurality of radially inward plenum layers 332 together, the radially outward end 312 of the heat transfer tube 310 within the radially outward tube receiving orifice 369, and the radially inward end 314 of the heat transfer tube 310 within the radially inward tube receiving orifice 349. In an embodiment, the metallurgically bonding can also include applying an electrical current E1 to the core flow path heat exchanger 300. In an embodiment, the electrical current E1 is applied to the core flow path heat exchanger 300 while the load F1 is being applied to compress the plurality of radially outward plenum layers 352 together, the plurality of radially inward plenum layers 332 together, the radially outward end 312 of the heat transfer tube 310 within the radially outward tube receiving orifice 369, and the radially inward end 314 of the heat transfer tube 310 within the radially inward tube receiving orifice 349. The method 500 may further include forming each of the plurality of radially outward plenum layers 352 and forming each of the plurality of radially inward plenum layers 332. The plurality of radially outward plenum layers 352 and the plurality of radially inward plenum layers 332 may be formed by casting or machining.

At block 514, the core flow path heat exchanger 300 is operably connected to a hydrogen fuel tank 224. Operably connecting may include fluidly connecting the core flow path heat exchanger 300 to the hydrogen fuel tank 224 so that hydrogen fuel may flow from the hydrogen fuel tank 224 to the core flow path heat exchanger 300. Block 514 may include installing a hydrogen fuel line connector into the core flow path heat exchanger 300 to operably connect the core flow path heat exchanger 300 to the hydrogen fuel tank 224.

While the above description has described the flow process of FIG. 13 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine engine system, comprising:
   at least one hydrogen fuel tank;
   a core flow path heat exchanger in a core flow path, wherein the core flow path heat exchanger comprises a radially outward plenum assembly, a radially inward plenum assembly, and a plurality of heat transfer tubes extending from the radially inward plenum assembly to the radially outward plenum assembly across the core flow path; and
   engine systems located in the core flow path, the engine system comprising at least a compressor section, a combustor section having a burner, and a turbine section,
   wherein the core flow path heat exchanger is arranged in the core flow path downstream of the combustor section, and
   wherein hydrogen fuel is supplied from the at least one hydrogen fuel tank through a hydrogen fuel supply line, passing through the core flow path heat exchanger and then supplied into the burner for combustion.

2. The turbine engine system of claim 1, wherein the core flow path heat exchanger is a hydrogen-to-air heat exchanger.

3. The turbine engine system of claim 1, wherein the turbine section further comprises a high pressure turbine and a low pressure turbine arranged downstream of the high pressure turbine and the combustor section, wherein the core flow path heat exchanger is arranged in the core flow path downstream of the low pressure turbine.

4. The turbine engine system of claim 3, wherein the main engine core further comprises an outlet arranged downstream of the low pressure turbine, wherein the core flow path heat exchanger is arranged in the core flow path downstream of the low pressure turbine and upstream of the outlet.

5. The turbine engine system of claim 1, wherein the turbine section further comprises a high pressure turbine and a low pressure turbine arranged downstream of the high pressure turbine and the combustor section, wherein the core flow path heat exchanger is arranged in the core flow path between the low pressure turbine and the high pressure turbine.

6. The turbine engine system of claim 1, wherein each of the plurality of heat transfer tubes is configured to convey the hydrogen fuel therein across the core flow path of the turbine engine system.

7. The turbine engine system of claim 6, wherein the hydrogen fuel is configured to absorb heat from the core flow path through each of the plurality of heat transfer tubes while traversing the core flow path within each of the plurality of heat transfer tubes.

8. The turbine engine system of claim 1, wherein the radially outward plenum assembly further comprises:
a plurality of radially outward plenum layers, wherein a radially outward plenum is formed between each of the plurality of radially outward plenum layers, the radially outward plenum is configured to convey the hydrogen fuel to the plurality of heat transfer tubes or receive the hydrogen fuel from the plurality of heat transfer tubes.

9. The turbine engine system of claim 8, wherein the radially outward plenum extends circumferentially around an engine central longitudinal axis of the turbine engine system.

10. The turbine engine system of claim 8, wherein the radially outward plenum assembly further comprises: one or more radially outward plenum orifices fluidly connecting the radially outward plenum to other radially outward plenum within the radially outward plenum assembly.

11. The turbine engine system of claim 1, wherein the radially outward plenum assembly further comprises:
a plurality of radially outward plenum layers, wherein a radially outward tube receiving orifice is formed between each of the plurality of radially outward plenum layers, the radially outward tube receiving orifice being configured to receive therein a heat transfer tube of the plurality of heat transfer tubes.

12. The turbine engine system of claim 1, wherein the radially inward plenum assembly further comprises:
a plurality of radially inward plenum layers, wherein a radially inward plenum is formed between each of the plurality of radially inward plenum layers, the radially inward plenum is configured to convey the hydrogen fuel to the plurality of heat transfer tubes or receive the hydrogen fuel from the plurality of heat transfer tubes.

13. The turbine engine system of claim 12, wherein the radially inward plenum extends circumferentially around an engine central longitudinal axis of the turbine engine system.

14. The turbine engine system of claim 12, wherein the radially inward plenum assembly further comprises: one or more radially inward plenum orifices fluidly connecting the radially inward plenum to other radially inward plenum within the radially inward plenum assembly.

15. The turbine engine system of claim 1, wherein the radially inward plenum assembly further comprises:
a plurality of radially inward plenum layers, wherein a radially inward tube receiving orifice is formed between each of the plurality of radially inward plenum layers, the radially inward tube receiving orifice being configured to receive therein a heat transfer tube of the plurality of heat transfer tubes.

16. A method of assembling a core flow path heat exchanger for a turbine engine system, the method comprising:
stacking a plurality of radially outward plenum layers, wherein a radially outward plenum is formed between each of the plurality of radially outward plenum layers, and wherein a radially outward tube receiving orifice is formed between each of the plurality of radially outward plenum layers;
stacking a plurality of radially inward plenum layers, wherein a radially inward plenum is formed between each of the plurality of radially inward plenum layers, and wherein a radially inward tube receiving orifice is formed between each of the plurality of radially inward plenum layers;
inserting a radially outward end of a heat transfer tube into the radially outward tube receiving orifice;
inserting a radially inward end of the heat transfer tube into the radially inward tube receiving orifice;
metallurgically bonding the plurality of radially outward plenum layers together, the plurality of radially inward plenum layers together, the radially outward end of the heat transfer tube within the radially outward tube receiving orifice, and the radially inward end of the heat transfer tube within the radially inward tube receiving orifice; and
operably connecting the core flow path heat exchanger to a hydrogen fuel tank.

17. The method of claim 16, wherein the metallurgically bonding comprises at least one of field assisted sintering technology (FAST) and spark plasma sintering (SPS).

18. The method of claim 16, wherein the metallurgically bonding comprises:
applying a load to compress the plurality of radially outward plenum layers together, the plurality of radially inward plenum layers together, the radially outward end of the heat transfer tube within the radially outward tube receiving orifice, and the radially inward end of the heat transfer tube within the radially inward tube receiving orifice; and
applying an electrical current to the core flow path heat exchanger.

19. The method of claim 16, further comprising:
forming each of the plurality of radially outward plenum layers; and
forming each of the plurality of radially inward plenum layers.

* * * * *